United States Patent [19]

Schmeidl

[11] Patent Number: 5,675,002
[45] Date of Patent: Oct. 7, 1997

[54] PURIFICATION OF HYDROPHOBIC SOLIDS

[75] Inventor: Karl Schmeidl, Gefrees, Germany

[73] Assignee: BASF Aktiengesellschaft, Ludwigshafen, Germany

[21] Appl. No.: 367,233

[22] PCT Filed: Jul. 13, 1993

[86] PCT No.: PCT/EP93/01829

§ 371 Date: Jan. 20, 1995

§ 102(e) Date: Jan. 20, 1995

[87] PCT Pub. No.: WO94/02550

PCT Pub. Date: Feb. 3, 1994

[30] Foreign Application Priority Data

Jul. 23, 1992 [DE] Germany .......... 42 24 302.5

[51] Int. Cl.⁶ .......................................... C09B 47/04
[52] U.S. Cl. ................................................ 540/122
[58] Field of Search ............................ 540/139, 122

[56] References Cited

U.S. PATENT DOCUMENTS 4,459,233 7/1984 Fabian et al. ............... 260/245.86
4,789,739 12/1988 Kranz et al. .................... 540/137

*Primary Examiner*—Mukund J. Shah
*Assistant Examiner*—Pavanaram K. Sripada
*Attorney, Agent, or Firm*—Oblon, Spivak, McClelland, Maier & Neustadt, P.C.

[57] ABSTRACT

Purification of hydrophobic solids by forming granules in the presence of water comprises treating the solids, if desired more than once, with one or more different two-phase systems comprising A) a phase which wets the solids and effects granule formation and which consists essentially of one or more water-immiscible or partially water-miscible organic liquids, and B) a phase which takes up the impurities and which consists essentially of
B1) water, one or more water-miscible organic liquids and if desired an inorganic acid or an inorganic base, or
B2) water and an inorganic acid in the heat and subsequently separating the resulting granules from the aqueous phase.

10 Claims, No Drawings

PURIFICATION OF HYDROPHOBIC SOLIDS

The present invention relates to a novel process for purifying hydrophobic solids to form granules in the presence of water. Generally, chemical compounds are obtained in their synthesis in a form which necessitates further purification. For example, in the case of coloring agents such as pigments it is necessary for coloristic as well as toxicological reasons to carry out a purification of the crude products in order that organic impurities such as by-products and unconverted starting compounds but also inorganic impurities such as metal salts, which are used as catalysts or in the case of metal-containing pigments such as copper phthalocyanines as starting materials, may be removed. In addition, the crude pigments generally also require finishing; that is, their crystal form and particle size has to be additionally optimized.

In the generally known purification processes, the crude pigments are treated either with sulfuric acid or with organic solvents which dissolve only the impurities. In both cases the pigments are separated from the resulting suspension by filtration and must afterwards be washed with large amounts of water. The workup of the resulting solvent and water quantities is costly.

To finish the crude pigments, i.e. convert them into a granular form, various processes are known in which the pigments are in each case treated with a two-phase mixture of water and a water-immiscible organic liquid. For instance, DE-A-36 36 428 describes a process using aliphatic $C_3$–$C_9$-ketones as organic liquid. DE-A-24 12 369 and DE-A-25 20 528 disclose for this purpose the use of-water-immiscible alcohols, aliphatic and aromatic hydrocarbons, halogenated aliphatic hydrocarbons and esters. The two-phase systems may also have added to them further additives which are solid at room temperature, for example carrier substances such as resins (DE-A-25 40 335 and DE-A-26 00 211).

However, the known processes have the disadvantage that the purification and finishing/granule formation are carried out separately and that the purification additionally produces large amounts of liquids to be worked up.

It is an object of the present invention to remedy these defects and to provide a technically simple, economical process for the simultaneous purification and granule formation of the pigments.

We have found that this object is achieved by a novel process for purifying hydrophobic solids to form granules in the presence of water, which comprises treating the solids, if desired more than once, with one or more different two-phase systems comprising A) a phase which wets the solids and effects granule formation and which consists essentially of one or more water-immiscible or partially water-miscible organic liquids, and B) a phase which takes up the impurities and which consists essentially of B1) water, one or more water-miscible organic liquids and if desired an inorganic acid or an inorganic base, or B2) water and an inorganic acid in the heat and subsequently separating the resulting granules from the aqueous phase.

The purification process of the invention has many potential uses. The solids to be treated should be substantially insoluble not only in the organic liquids used but also in water. A particularly important group of industrial products includes for example pigments, dyes and their intermediates.

Pigments which can be treated according to the invention are essentially crude pigments as synthesized or as obtained from a subsequent activating dry or wet grind, or pigments still containing heavy metal impurities after finishing. Examples of suitable pigment groups are phthalocyanines, isoindolines, perylene pigments, azo pigments and pigments from vat dyes. The pigments are not just purified, but can, given suitable conditions, be at the same time influenced in their crystal structure and their particle size in the desired manner, so that coloristically useful pigments are obtained.

Suitable dyes include for example disperse dyes, solvent dyes, basic dyes in the form of the underlying bases, mordant dyes, vat dyes and metal complex dyes.

Similarly, the intermediates occuring in the synthesis of the pigments and dyes mentioned come into consideration for purification according to the invention. For instance, the trihydroxy compound which in the synthesis of vat dyes is produced in mixture with the desired dihydroxyanthraquinone can be removed in a simple manner, or, in the synthesis of basic dyes, the desired dehydrothio-p-toluidine can be separated from a crude melt of the primuline bases.

To produce the two-phase system it is possible to use for example the following water-immiscible or partially water-miscible liquids (A):

aromatic and aliphatic hydrocarbons which are liquid at the use temperature, such as toluene, o-, m- and p-xylene, mesitylene, ethylbenzene and diethylbenzene; mixtures having an aromatics content >97% by volume are commercially available under the name Solvesso® (Esso Chemie);

$C_4$–$C_8$-alkanols such as n-butanol, isobutanol, sec-butanol, n-pentanol, isopentanol, n-hexanol, n-octanol, tetrahydrofurfuryl alcohol and cyclohexanol;

$C_4$–$C_8$-ketones such as methyl ethyl ketone, methyl isopropyl ketone, methyl isobutyl ketone, methyl sec-butyl ketone, methyl tert-butyl ketone, methyl isoamyl ketone, diethyl ketone, ethyl amyl ketone, diisopropyl ketone, diisobutyl ketone, mesityl oxide and cyclohexanone;

$C_5$–$C_{14}$-alkanoic acids and their $C_1$–$C_8$-alkyl esters such as 2-ethylhexanoic acid, methyl and ethyl 2-ethylhexanoate;

$C_4$–$C_5$-lactones such as γ-butyrolactone, which may be substituted by $C_2$–$C_5$-alkyl or $C_4$-alkylene, such as hexahydrophthalide;

di-$C_2$–$C_4$-alkyl ethers such as diethyl ether, tetrahydrofuran, 3-methyl-tetrahydrofuran and pentamethylene oxide;

$C_2$–$C_3$-alkylene glycol mono-$C_3$–$C_6$-alkyl ether and di-$C_1$–$C_4$-alkyl ether such as ethylene glycol monobutyl and monohexyl ethers, propylene glycol monobutyl and monohexyl ethers, ethylene glycol dimethyl, diethyl, dipropyl, diisopropyl and dibutyl ethers, propylene glycol dimethyl, diethyl and dibutyl ethers, di-, tri- and tetraethylene glycol monomethyl, monoethyl and monobutyl ethers, di-, tri- and tetrapropylene glycol monomethyl and monoethyl ethers and di- and triethylene glycol dimethyl ethers;

$C_1$–$C_4$-alkyl esters of $C_2$–$C_3$-alkylene glycol mono-$C_1$–$C_4$-alkyl ethers such as ethylene glycol monomethyl ether acetate, monoethyl ether acetate and monobutyl ether acetate; halobenzenes such as chlorobenzene, dichlorobenzene and trichlorobenzene;

$C_1$–$C_4$-alkoxybenzenes such as anisole, phenetole and resorcinol dimethyl ether;

$C_1$–$C_8$-alkyl esters of aromatic carboxylic acids such as methyl benzoate, dimethyl phthalate, diethyl phthalate and methyl trimellitate;

aromatic nitrocompounds such as nitrobenzene and nitrotoluene
and mixtures thereof.

Suitable water-miscible organic liquids for the aqueous mixture (B1) include for example:

$C_1$–$C_3$-alkanols such as methanol, ethanol, n-propanol and isopropanol;

acetone and its derivatives such as hydroxyacetone and diacetone alcohol;

$C_1$–$C_4$-alkanoic acids which may be substituted by hydroxyl, $C_1$–$C_2$-alkoxy or halogen, such as formic acid, acetic acid, propionic acid, methoxyacetic acid, lactic acid, trifluoro-acetic acid, chloroacetic acid and chloropropionic acid;

aliphatic $C_1$–$C_{12}$-amines and-alcohol-amines such as ethanol-amine, diethanolamine and triethanolamine;

aromatic sulfonic acids such as benzene-and toluene-sulfonic acid;

$C_2$–$C_4$-alkylene glycols and di-, tri- and tetra-$C_2$–$C_3$-alkylene glycols such as ethylene glycol, propylene glycol, butylene glycol, di-, tri- and tetraethylene glycol and di-, tri- and tetrapropylene glycol;

$C_2$–$C_3$-alkylene glycol mono-$C_1$–$C_2$-alkyl ethers such as ethylene glycol monomethyl and monoethyl ethers and propylene glycol monomethyl and monoethyl ethers and mixtures thereof.

Preferred organic liquids for the phases (A) and (B1) are those which can be recovered by distillation and boil below 220°C. In this connection, moreover, the formation of binary, predominantly also-ternary, heteroazeotropes can be exploited with advantage. The lighter or heavier (in terms of the specific weight) phase of the distillate obtained can be recirculated in a specific manner, making it easy to control the composition of the total system.

A further factor to be taken into account in choosing the organic liquids used is of course that they do not enter a chemical reaction with the other components. It is particularly advantageous to use as organic liquid (A) or (B1) that organic liquid which served as solution medium for the precursor of the crude product.

The inorganic acids added if desired to the aqueous phase (B1) (or (B2)) include not only for example phosphoric acid and amido-sulfuric acid but preferably sulfuric acid and in particular hydrochloric acid. Preferred bases are potassium hydroxide, in particular sodium hydroxide and also ammonia. In addition it is possible to use for example magnesium hydroxide, calcium hydroxide and lithium hydroxide. In most cases the addition of an inorganic acid will be preferable.

In the case of the phase (B2) consisting of water, hydrochloric acid and/or sulfuric acid. Suitable for the organic phase (A1) are in particular the abovementioned $C_1$–$C_3$-alkylene glycol mono-$C_3$–$C_6$-alkyl ethers and di-$C_1$–$C_4$-alkyl ethers. Particular preference is here given to ethylene glycol monobutyl ether.

The possible compositions of the two-phase system composed of (A) and (B) are many and varied. The organic phase (A) preferably comprises aromatic hydrocarbons, in particular distillates (Solvesso), also toluene, xylene or ethylbenzene, also mixed with ketones such as methyl isobutyl ketone.

Preferred phases (B) include for example water+carboxylic acid mineral acid, water+alcohol+mineral acid, water+alcohol+inorganic or organic base, water+glycols+mineral acid, water+ketone+mineral acid, water+carboxylic acid and water+mineral acid.

Specific examples of components for forming preferred two-phase systems are:

| Phase (A) | Phase (B) |
|---|---|
| Methyl isobutyl ketone | water + acetic acid + hydrochloric acid + sulfuric acid |
| Methyl isobutyl ketone + ethylbenzene | water + acetic acid + hydrochloric acid |
| Methyl isobutyl ketone + tetrahydrofuran | water + acetic acid + hydrochloric acid |
| Methyl isobutyl ketone | water + acetic acid + hydrochloric acid |
| Solvesso 150* | water + acetic acid + hydrochloric acid |
| Xylene | water + acetic acid + hydrochloric acid |
| Ethylbenzene | water + acetic acid + hydrochloric acid |
| 3-Methyltetrahydrofuran | water + acetic acid + hydrochloric acid |
| 2-Ethylhexanoic acid | water + acetic acid + hydrochloric acid |
| Methyl isobutyl ketone + propylene glycol monoisopropyl ether | water + hydrochloric acid |
| 3-Methyltetrahydrofuran | water + methanol + hydrochloric acid |
| Methyl isobutyl ketone + propylene glycol monobutyl ether | water + hydrochloric acid |
| Methyl isobutyl ketone + ethylene glycol monobutyl ether | water + hydrochloric acid |
| Methyl isobutyl ketone + isobutanol | water + methanol + hydrochloric acid |
| Methyl isobutyl ketone + isobutanol | water + hydrochloric acid |
| Methyl isobutyl ketone | water + hydrochloric acid |
| Methyl isobutyl ketone + tetrahydrofuran | water + hydrochloric acid |
| Xylene | water + propylene glycol monomethyl ether + hydrochloric acid |
| 2-Ethylhexanoic acid + γ-butyrolactone | water + hydrochloric acid |
| Solvesso 150 | water + hydrochloric aid |
| Ethylene glycol monobutyl ether | water + hydrochloric acid |
| Pentanol | water + sulfuric acid |
| Xylene | water + n-propanol + sulfuric acid |
| Xylene | water + acetic acid + sulfuric acid |
| Xylene | water + propylene glycol monomethyl ether + sulfuric acid |
| Xylene + methyl isobutyl ketone | water + acetic acid + sulfuric acid |
| Cyclohexanone + ethylene glycol monobutyl ether | water + sulfuric acid |

| Phase (A) | Phase (B) |
|---|---|
| Xylene + cyclohexanone + ethylene glycol monobutyl ether | water + sulfuric acid |
| Cyclohexanol + ethylene glycol monobutyl ether | water + sulfuric acid |
| Xylene + cyclohexanol + ethylene glycol monobutyl ether | water + sulfuric acid |
| Pentamethylene oxide | water + acetic acid + formic acid |
| Methyl isobutyl ketone | water + acetic acid + formic acid |
| Xylene | water + acetic acid + formic acid |
| Toluene | water + acetic acid + formic acid |
| Ethylbenzene | water + acetic acid + formic acid |
| Solvesso 150 | water + acetic acid + formic acid |
| Xylene | water + propionic acid + formic acid |
| Methyl isobutyl ketone | water + formic acid |
| Ethylbenzene | water + formic acid |
| Ethylbenzene | water + acetic acid |
| Methyl isobutyl ketone | water + propylene glycol monomethyl ether |
| Xylene | water + propylene glycol monomethylether + sodium hydroxide solution |
| Xylene | water + methanol + sodium hydroxide solution |
| Xylene | water + methanol + ammonia |
| Xylene | + ethanolamine + propylene glycol monomethyl ether |

*mixture of hydrocarbons liquid at room temperature with an aromatics content > 99%, a boiling range from 185 to 206° C. and a density of 0.898 g/cm$^3$ The composition of the phase (B) which effects the purification of the solid is advantageously adapted to the impurities present. Thus, organic impurities are generally taken up by the organic liquid, whereas the inorganic impurities are generally dissolved in water whose pH can be adjusted by addition of acid or base to whichever is the best value. For example, to remove heavy metal, ammonium and chloride ions the aqueous phase is preferably acid, whereas to separate off acid impurities such as phthalic acid, phthalimide and tetrachlorophthalamic acid it is preferably made basic.

Generally, this combination of organic and inorganic solvents in the phase (B1) makes it possible to remove organic and inorganic impurities in one step. Even tarlike impurities as are produced in a solvent in the synthesis of copper phthalocyanine from phthalic acid, urea and copper salts can be transferred into the aqueous phase. In a specific case, however, it can be of advantage to treat the solid to be purified for example first with a water-richer and then with a water-leaner phase (B1). An addition of complexing agents such as ethylenediaminetetraacetic acid or of its sodium salts can likewise in certain circumstances facilitate the removal of heavy metal ions.

However, it is not necessary in every case that the aqueous phase (B) contains organic solvent. Frequently, the addition of inorganic acid is enough to achieve the desired purifying effect. For example, for purifying metal phtalocyanines in particular it is advantageous to use mixtures of the above-listed alkylene glycol ethers (A1) with water and hydrochloric acid (B21). Here the aqueous phase preferably contains up to about 7% by weight of hydrochloric acid.

The water-immiscible or only partially water-miscible liquid (A) wets the solid particles to be purified and causes them to agglomerate. In this process, the formation of granules is promoted by stirring in particular in the heat.

The consistency of the agglomerates formed can be effectively controlled via the proportion of solid to liquid (A). Particularly form-stable granules are generally obtained when the amount of (A) required for complete wetting of the solid is only slightly exceeded. These granules have the advantage that they are easy to separate from the liquid and only small amounts of the aqueous phase remain in adherence. If too much (A) is used, the agglomerates stick together to form a mush which has to be freed for example by kneading from the enclosed aqueous phase. If conversely too little (A) is added, agglomeration will be incomplete. This can initially be of advantage for the purifying process, and the desired granules can again be formed by later addition of (A).

The best amount of liquid (A) in an individual case can easily be determined in a few experiments. An excess of (A) can easily be removed by distillation; conversely, a deficiency of (A) can be made good later. For instance, a deficiency of (A) can arise through repeated treatment of the solid with new aqueous phase in each case, since the aqueous phase likewise takes up small amounts of (A).

Generally, each phase of the two-phase system of the invention also contains certain amounts of the other phase. To achieve optimum conditions, these saturation phenomena should be taken into account.

The formation of the two-phase system required for simultaneous purification and granule formation depends inter alia on the composition of the overall system. Reducing the amount of one component can lead to the breakdown of the phase boundary; the addition of a further component or increasing the proportion of a component already present is a prerequisite for the formation of the two-phase system in the first place.

The temperature too plays an important part. As a rule, the miscibility will decrease as the temperature increases. An exception to this rule, however, are ethylene glycol mono-n-propyl or monoisobutyl ether, propylene glycol mono-n-propyl or monoisopropyl or mono-n-butyl ether/water mixtures, which do not separate until the temperature is elevated.

The mutual miscibility can also be reduced by the addition of further substances, for example by dissolving inorganic salts such as sodium chloride in the aqueous phase. Conversely, it can be of advantage if the purifying effect is to be increased first to add to the organic phase (A) a solvent such as ethanol which enhances the miscibility of the two phases or changes the two-phase mixture into a one-phase system, and then, for granule formation, to restore the two-phase system by distilling off this solvent or by further addition of water.

The process of the invention can advantageously also be carried out in the presence of auxiliaries as customarily used for example in the further use of the pigments (additives, linseed oil varnish). Examples of such auxiliaries include resins, plasticizers, laking agents, waxes, nitrocellulose and dustproofing agents, the addition of which can yield the appropriately coated and specifically prepared pigments directly.

The process of the invention is advantageously carried out as follows. The solid to be purified and the liquids (A) and (B) are, preferably with stirring, heated in the presence or absence of the auxiliaries mentioned to a temperature from generally 30° to 150° C., preferably from 60° to 120 C. The liquids (A) and/or (B) can in part also be added a little at a time.

The mixture is generally held at the set temperature for from 5 to 300 min, preferably from 20 to 120 min. The pressure will usually be atmospheric.

Then the eluate formed, which chiefly consists of the aqueous phase (B) and the dissolved-out impurities, is separated off, preferably hot. Since the impurities are generally more soluble in the hot eluate, this means that less aqueous phase (B) is needed. Separation can be effected in a conventional manner, for example by filtration with or without suction, centrifuging or expression. It is also advantageous to use a slit tube.

The purified granules remain behind and are generally subsequently dried.

Preference is given to carrying out a plurality of purifying steps in succession, possibly with differingly composed two-phase systems.

It is particularly advantageous to carry out a three- or four-fold extraction. In the particularly preferred procedure, the removal of the first eluate is followed by addition of new phase (B) and of the portion of (A) removed with the eluate, removal of the second eluate, renewed addition of (B) and of a little (A), and then discharge of the entire reactor contents into a dryer. The third (or even fourth) eluate, separated off here in a conventional manner, can be used directly for the first extraction of a subsequent batch. The eluates of the first and second extraction are redistilled and can likewise be used for subsequent lots.

The drying of the hot moist granule, which generally contains more than 70% by weight of the purified solid as well as predominant portions of phase (A) and minor portions of phase (B), can be effected with particular advantage in a rotary dryer such as a double cone dryer and in particular a tumble dryer. It is advisable here first to consolidate the granule by predrying it under reduced pressure in the stationary state to a residual moisture content of less than about 15% by weight and then to evaporate off the remaining fluid by heating with slow agitation.

The process of the invention can be carried out continuously as well as batchwise. It is particularly advantageous to employ a closed system.

The process of the invention provides an advantageous way of purifying hydrophobic solids while at the same time crystallizing them or modifying their crystal structure. It is particularly advantageous that the purified products are obtained in the form of stable granules which are easy to separate from the liquid phase containing the impurities. Not only inorganic but also organic impurities are simple to remove so that the purified products generally have purities greater than 99%. The liquids used in forming the two-phase system of the invention can be redistilled and hence are available for further purifying work.

EXAMPLE 1

A mixture of 390 g of water, 153 g of n-propanol and 113 g of 76% strength by weight sulfuric acid (phase B), 54 g of Solvesso® (aromatics content 99%, boiling range 185° to 206° C., density 0.898 g/cm$^3$) (phase A), and 150 g of crude copper phthalocyanine (ionizable copper content about 1.5% by weight; prepared by reacting phthalic anhydride, urea and copper salts in the presence of molybdenum salts as catalyst in Solvesso 150 as solvent analogously to Example 5 of DE-C-31 06 541)

was heated for 1 h under reflux (90° C.) with stirring.

Then 250 ml of a uniform liquid phase were distilled off, the temperature rising to 99° C. After cooling down to 85° C., the aqueous phase was passed through a screen having a mesh size of about 0.5 mm to remove the granule.

The granule (solids content about 70%) was washed with a little water. A sample was dried at 180° C. under reduced pressure. The ionizable copper content after this first extraction was 0.1% by weight.

The bulk (313 g) of the moist granule was subjected to a second extraction with 100 g of water, 250 ml of the above-obtained distillate from the first treatment, 34 g of 76% strength by weight sulfuric acid and 8 g of Solvesso 150.

The dried granule had a pigment content of 99% and an ionizable copper-content of 0.01% by weight.

EXAMPLE 2

A mixture of 145 g of water, 80 g of 1-methoxy-2-propanol and 50 g of 76% strength by weight sulfuric acid (phase B), 64 g of Solvesso 150 (phase A), and 150 g of the crude copper phthalocyanine of Example 1 was heated at the boil (98° C.) for 1 h with stirring.

After addition of 230 ml of water 250 ml of liquid phase (50 ml of (A), 200 ml of (B)) were distilled off. After a further 10 minutes' heating at the boil, the batch was worked up analogously to Example 1.

The ionizable copper content of the granule after this first extraction was 0.18% by weight.

The bulk (156 g) of the unwashed moist granule was subjected to a second two-hour extraction with 250 ml of distillate from the first treatment and 50 g of 76% strength by weight sulfuric acid. The granules became aggregated.

After addition of 250 ml of water 230 ml of liquid phase (50 ml of (A), 180 mi of (B)) were distilled off while the temperature rose from about 98° to 103° C. 3 g of Solvesso 150 were added to effect complete granule formation. After a further 10 minutes' heating at the boil and cooling to 85° C., the batch was worked up analogously to Example 1.

The dried pigment granule had an ionizable copper content of 0.02% by weight.

EXAMPLE 3

A mixture of 63 g of water, 162 g of n-propanol and 67 g of 76% strength by weight sulfuric acid (phase B) and 150 g of the crude copper phthalocyanine of Example 1 were heated to the boil with stirring for 90 min. After addition of 200 g of water the batch was additionally refluxed for 30 min. Then 44 g of Solvesso 150 (phase A) were added dropwise over 30 min. After renewed addition of 100 g of water the aqueous phase was separated from the granule at 75° C.

The ionizable copper content of the washed and dried granule after this first extraction was 0.04% by weight.

The bulk (155 g) of the moist granule was subjected to a second one-hour extraction at 85° C. with 100 g of water and 17 g of 76% strength by weight sulfuric acid. After cooling down to 80° C. the liquid was separated from the granule, which was then additionally washed with 100 g of water.

The dried pigment granule (107 g) had an ionizable copper content of 0.02% by weight.

EXAMPLE 4

A mixture of 105 g of water and 120 g of 1-methoxy-2-propanol (binary azeotrope) and 67 g of 76% strength by weight sulfuric acid (phase B), 35 ml of toluene (phase A), and 150 g of the crude copper phthalocyanine of Example 1 was heated under reflux (90° C.) for 5 h with stirring. After cooling down to 85° C. the batch was worked up analogously to Example 1.

The ionizable copper content of the washed and dried granule after this first extraction was 0.14% by weight, the chloride content was less than 0.01% by weight.

The bulk (141 g) of the moist granule was subjected to a second two-hour extraction with 150 ml of water, 25 g of 76% strength by weight sulfuric acid and 10 ml of toluene. The workup was carried out analogously to Example 1.

The dried pigment granule (106 g) had an ionizable copper content of 0.03% by weight.

EXAMPLE 5

A mixture of 600 g of 77% strength by weight formic acid (phase B) and 150 g of the crude copper phthalocyanine of Example 1 was heated with stirring at 100° C. for 6 h. After cooling down to 90° C. 59 g of Solvesso 150 (phase A) were added. After a further 10 minutes at 105° C. and subsequent cooling to 85° C., the batch was worked up analogously to Example 1.

The dried pigment granule had an ionizable copper content of 0.07% by weight.

EXAMPLE 6

A mixture of 600 g of 75% strength by weight acetic acid (phase B) and 150 g of the crude copper phthalocyanine of Example 1 was heated with stirring at 100° C. for 6 h. After cooling down to 90° C., 70 g of Solvesso 150 (phase A) were added. After a further 10 minutes at 102° C., the batch was worked up analogously to Example 1.

The dried pigment granule had an ionizable copper content of 0.04% by weight.

EXAMPLE 7

To mutually saturate the phases of the two-phase system, 344 g of water and 514 g of 99.5% strength by weight acetic acid (phase B) and 114 g of methyl isobutyl ketone and 28 g of Solvesso 150 (phase A) were mixed at room temperature. In the process, about 15 ml of light phase (A) were formed.

A mixture of 330 ml of the heavy phase formed and 7 g of 76% strength by weight sulfuric acid (phase B), 33 g of methyl isobutyl ketone and 28 g of Solvesso 150 (phase A), and 270 g of the crude copper phthalocyanine of Example 1 which additionally contained 20 g of Solvesso 150 was then heated at the boil (99° C.) with stirring for 1 h.

Then 100 ml of liquid phase (from 60 to 64 ml of (A), from 40 to 36 ml of (B)) were distilled off, the temperature rising to 102° C. After a further 15 minutes' stirring at that temperature the granule formed underwent consolidation. The workup was carried out analogously to Example 1.

The ionizable copper content of the washed and dried granule after this first extraction was 0.1% by weight.

The bulk (260 g) of the moist granule was subjected to a second one-hour extraction with 330 ml of the above-prepared heavy phase composed of water, acetic acid, methyl isobutyl ketone and Solvesso 150, 100 ml of distillate from the first treatment, 5 g of Solvesso 150 and 7 g of 76% strength by weight sulfuric acid.

Then another 100 ml of liquid phase (61 ml of (A), 39 ml of (B)) were distilled off. After a further 15 minutes' heating at the boil, the batch was worked up in the usual manner.

The ionizable copper content of the washed and dried granule after this second extraction was 0.02% by weight.

The moist granule obtained was then subjected to a third 15-minute extraction with 420 ml of hot water. Then liquid phase was distilled off at 95° C., the heavy phase being recirculated into the reaction vessel. After 27 ml of light phase had been distilled off, the temperature rose to 99° C. Then 8 g of Solvesso 150 were added dropwise. After a further 15 minutes' heating at the boil, the batch was worked up in the usual manner.

The pigment granule dried in a rotary evaporator under a water pump vacuum at a temperature from 145° to 160° C. had, after this third extraction, an ionizable copper content of less than 0.01% by weight.

The mother liquors from the first and second extraction were worked up by distillation at a bath temperature from 140° to 150° C. and, with the addition of light phase, Solvesso 150 and sulfuric acid, used for further extraction runs.

EXAMPLE 8

To mutually saturate the phases of the two-phase system, 200 g of water, 680 g of 77% strength by weight formic acid, 136 g of methyl isobutyl ketone and 23 g of Solvesso 150 were mixed at room temperature. In the process, 27 ml of light phase (A) and 933 ml of heavy phase (B) were formed.

A mixture of 350 ml of the heavy phase (B) formed, 33 g of methyl isobutyl ketone and 27 g of Solvesso 150 (phase A), and 270 g of the crude copper phthalocyanine of Example 7 was then heated under reflux (104° C.) for 1 h with stirring. 134 ml of liquid phase (87 ml of (A), 47 ml of (B)) were then distilled off, the temperature rising to 106° C. After a further 15 minutes' stirring at that temperature, the batch was worked up analogously to Example 1.

The ionizable copper content of the washed and dried granule after this first extraction was 0.1% by weight.

The bulk (265 g) of the moist granule was subjected to a second one-hour extraction with 300 ml of the above-prepared heavy phase, 134 ml of distillate from the first treatment and 6 g of Solvesso 150.

Then another 100 ml of liquid phase (45 ml of (A), 55 ml of (B)) were distilled off. After a further 15 minutes' heating at the boil, the batch was worked up in the usual manner.

The ionizable copper content of the washed and dried granule after this second extraction was 0.015% by weight.

The moist granule obtained was then subjected to a third 15-minute extraction with 420 ml of hot water. Liquid phase was then distilled off at 94° C. with the heavy phase being recirculated into the reaction vessel. After 37 ml of light phase had been distilled off, the temperature rose to 99° C. 8 g of Solvesso 150 were then added dropwise. After a further 15 minutes' heating at the boil, the batch was worked up as in Example 7.

The dried pigment granule (207 g) had, after this third extraction, an ionizable copper content of less than 0.01% by weight.

The mother liquors were worked up as in Example 7 and re-used for extracting.

EXAMPLE 9

A mixture of 500 ml of the heavy phase of the two-phase system formed in Example 8 (phase B), 20 g of methyl isobutyl ketone and 40 g of Solvesso 150 (phase A), and 150 g of the crude copper phthalocyanine of Example 1 was heated at 104° C. for 2 h with stirring.

After 80 ml of liquid phase had been distilled off, heating was continued for a further 15 min at the boil. After cooling down to 85° C., the batch was worked up analogously to Example 1.

The ionizable copper content of the washed and dried granule after this first extraction was 0.03% by weight.

The bulk (147 g) of the moist granule was mixed with 250 ml of water and then adjusted with 25% strength by weight ammonia to pH 5.0. After subsequent addition of 5 g of tetrasodium ethylene-diaminetetraacetate the mixture was heated at the boil for 1 h with stirring. Liquid phase was then distilled off with the heavy phase being recirculated into the reaction vessel. After 27 ml of light phase had been distilled off, 25 ml of Solvesso 150 were added dropwise. After a further 15 minutes' heating at the boil, the batch was cooled down to 80° C. The rest of the workup was carried out in the usual manner.

The dried pigment granule after this second extraction had an ionizable copper content of 0.01% by weight.

EXAMPLE 10

A mixture of 140 ml of water, 24 g of 32% strength by weight hydrochloric acid, 33 g of ethylene glycol monobutyl ether and 140 g of the crude copper phthalocyanine of Example 1 was heated to the boil for 1 h with stirring. The liquid phase was separated hot from the granule via a sieve.

The moist granule obtained was subjected without intermediate isolation to a second extraction with 140 ml of water, 24 g of 32% strength by weight hydrochloric acid and 16 g of butylglycol. The liquid phase was separated off as above.

This second extraction was followed by an analogous third treatment.

The particular purities determined for washed and dried samples of the granules are listed in the following table:

| | Content in % by weight of | | | |
|---|---|---|---|---|
| | ionizable copper | Ammonium | Chloride | Phthalimide |
| after 1st extraction | 0,37 | 0,39 | 1,0 | 4,0 |
| after 2nd | 0,16 | 0,07 | 0,31 | 0,5 |

| | Content in % by weight of | | | |
|---|---|---|---|---|
| | ionizable copper | Ammonium | Chloride | Phthalimide |
| extraction after 3rd extraction | 0,04 | 0,003 | 0,02 | 0,23 |
| Crude product (for comparison) | 1,3 | 2,6 | 5,9 | 5,3 |

EXAMPLE 11

A mixture of 209 ml of heavy phase (B) (44 g of water, 134 g of acetic acid, 29 g of 32% strength by weight hydrochloric acid and 29 g of xylene mixture (about 25% by weight of ethylbenzene, from 10 to 20% by weight of o-xylene, remainder m- and p-xylene)) and 120 g of a crude copper phthalocyanine prepared from o-phthalodinitrile with a copper/copper chloride(I) mixture by the baking method was heated at 104° C. for 30 min with stirring. After addition of 27 g of xylene heating was continued for a further 30 min at 99° C. The liquid phase was then separated off at that temperature from the granule via a sieve.

The moist granule obtained was then subjected to a second extraction with the same amount of phase (B). After addition of 24 g of xylene the procedure used was analogous to that of the first extraction.

Following the subsequent third extraction, likewise with 209 g of (B), 15 g of xylene were added. After a further 30 minutes' heating at the boil, the moist granule was separated from the eluate via an inclined rotary sieve and then predried in a rotary dryer under reduced pressure initially without rotation and then dried to completion with slow agitation.

The resulting bead granule (118 g) had an ionizable copper content of less than 30 ppm (crude product: about 5000 ppm; determined by extraction with hydrochloric acid).

EXAMPLE 12

A mixture of 168 ml of water, 90 g of 99% strength by weight acetic acid and 50 g of 32% strength by weight hydrochloric acid (phase (B), and 180 g of a crude copper phthalocyanine as in Example 1 which had been subjected for about 20 h to an activating grinding with steel balls 25 mm in diameter in a ball mill in the presence of 20 g of 96% strength by weight sulfuric acid, was heated to a gentle boil (103° C.) for 2 h with stirring. After cooling down to 75° C. 90 g of a 24.5% strength by weight solution of polymerized rosin in methyl isobutyl ketone (Dertopol®; Willers, Engel & Co., Hamburg) were added within a short period of time. After 15 minutes' heating at 95° C. with stirring the eluate was separated via a sieve from the granules formed.

The moist granules were subjected to a second 10-minute extraction at 94° C. again in the presence of 300 ml of phase (B) and 7 g of methyl isobutyl ketone. Separation was carried out as above.

After a third treatment, carried out analogously to the second extraction, and subsequent drying in a vacuum drying cabinet, 165 g of granule were obtained with an ionizable copper content of 200 ppm (crude product: 12 000 ppm of copper).

The color test in an offset varnish produced in comparison with a commercial powder brand of a copper phthalocyanine pigment (Heliogen® Blue 7030, BASF) as respects color strength (allowing for the reduction in color strength due to the addition of Dertopol), hue, cleanness, transparency, divisibility and bake-on characteristics on the three-roll mill a similar result.

EXAMPLE 13

A mixture of 200 g of 21% strength by weight aqueous formic acid and 100 g of 78.8% strength by weight C.I. Solvent Yellow 33 (C.I. 47 000; crude product prepared by heating 2-methylquinoline with phthalic anhydride; impurities present include 14.3% by weight of phthalic acid) was heated at 98° C. for 30 min with stirring. Then 40 ml of xylene mixture was added dropwise over 10 min. After refluxing for one hour the aqueous phase was separated from the granules formed.

The moist granule was then subjected to a second extraction with 150 g of 21% strength by weight aqueous formic acid. After removal of the aqueous phase the moist granules were stirred up with 150 ml of water, which was then likewise separated off.

The dried granule (81 g) had a pigment content of 96.3%, while the phthalic acid and quinaldine contents were each below 0.1% by weight.

EXAMPLE 14

A mixture of 238 g of heavy phase (B) (40 g of water, 87 g of 100% strength by weight acetic acid, 103 g of 100% strength by weight formic acid and 8 g of xylene) and 100 g of a 78.3% strength by weight crude isodibenzanthrone (prepared by condensation of 3-bromobenzanthrone with sodium sulfide and subsequent cooking with alcoholic potassium hydroxide solution) was heated to 95° C. with stirring. After dropwise addition of 92 ml of xylene (phase A) the batch was refluxed for 10 min at 98° C. Then 40 ml of liquid phase (21 ml of (A), 19 ml of (B)) were distilled off. Then the aqueous phase was separated off.

The moist granule obtained was subjected to a second extraction with 277 g of phase (B). In the course of the distillative removal of 130 ml of liquid phase (53 ml of (A), 77 ml of (B)), the temperature rose to 106° C., and the granule completely disintegrated. After 15 minutes' boiling under reflux, cooling down to 98° C. and addition of the distillate obtained, 40 ml of xylene were added dropwise. Then the aqueous phase was separated from the granule formed.

The second extraction was followed by an analogous third extraction.

The dried granule (94 g) had an isodibenzanthrone content of 84% by weight.

EXAMPLE 15

A mixture of 100 g of crude C.I. Vat Black 9 (C.I. 65230; crude prepared by condensation of tetrabromopyranthrone, aminoviolanthrone and 1-aminoanthraquinone in nitrobenzene in the presence of copper oxide and sodium acetate) and 290 g of 34.5% strength by weight sulfuric acid was heated to 101° C. for 1.5 h with stirring. After gradual addition of 40 ml of n-pentanol the heating was continued for 30 min under reflux.

The liquid phase (262 g) was separated hot, via a sieve, from the granule formed.

The moist granule was then subjected to a second extraction with 230 g of 43.5% strength by weight sulfuric acid, in the course of which 36 ml of water-saturated pentanol were azeotroped out with the heavy phase condensed in the condenser passing through a separator. The removal of pentanol caused the granule to disintegrate. After 30 minutes' refluxing first 60 ml of water and then 40 ml of pentanol were added. After a further 30 minutes' refluxing the liquid phase was separated from the re-formed granule.

The moist granule obtained was then subjected to a third extraction which was carried out analogously to the second extraction except that subsequently only 35 ml of pentanol were added.

The dried pigment granule (90 g) had an ionizable copper content of 280 ppm (crude product: 80 000 ppm) and a 10% higher color strength and a distinctly improved cleanness of hue.

EXAMPLE 16

A mixture of 500 g of a moist crude granule of Heliogen® Green GN (C.I. 74 120), prepared according to DRP 741 949 by chlorination of copper phthalocyanine in an aluminum chloride melt, subsequent discharge of the melt into water and addition of p-xylene to the aqueous pigment suspension until granule formation, containing 160 g of crude pigment and 340 g of moisture (50 g of p-xylene, remainder water, hydrochloric acid and dissolved aluminum salts), 50 g of p-xylene and 330 g of water was refluxed for 30 min at 92° C. Then the liquid phase was separated hot from the granule.

For the analogous second extraction the moist granule was admixed with 143 g of water, 152 g of 1-methoxy-2-propanol and 5 g of 50% strength by weight sodium hydroxide solution (pH of the mixture 12.5).

The analogous third extraction of the re-removed moist granule was likewise carried out by stirring with 143 g of water, 152 g of 1-methoxy-2-propanol and 5 g of 50% strength by weight sodium hydroxide solution (pH 12.5).

To remove 1-methoxy-2-propanol present, the isolated moist granule was admixed with 350 ml of water. After the distillative removal of 100 ml of the binary azeotrope water/1-methoxy-2-propanol the granule was again separated from the aqueous phase.

The dried granule had a pigment content of greater than 99% (starting material 95%). The level of chlorinated phthalic acid derivatives was 0.01% by weight—100 times lower than in the crude.

I claim:

1. A process for purifying hydrophobic solids of pigments of phthalocyanines, to form granules in the presence of water, which comprises treating the solids, if desired more than once, with one or more different two-phase systems comprising
    A) a phase which wets the solids and effects granule formation and which consists essentially of one or more water-immiscible or partially water-miscible organic liquids, and
    B) a phase which takes up the impurities and which consists essentially of
        B1) water, one or more water-miscible organic liquids and if desired an inorganic acid or an inorganic base, or
        B2) water and an inorganic acid by heating and subsequently separating the resulting granules from the aqueous phase.

2. A process as claimed in claim 1, wherein the water-immiscible or partially water-miscible organic liquid (A) comprises aromatic or aliphatic hydrocarbons which are liquid at the use temperature, halogenated aliphatic hydrocarbons, $C_4$–$C_8$-alkanols, $C_4$–$C_8$-ketones, $C_5$–$C_{14}$-alkanoic acids or their $C_1$–$C_8$-alkyl esters, $C_4$–$C_8$-lactones, di-$C_2$–$C_4$-alkyl ethers, $C_2$–$C_3$-alkylene glycol mono-$C_3$–$C_6$-alkyl ethers or di-$C_1$–$C_4$-alkyl ethers, di-, tri- or tetra-$C_2$–$C_3$-alkylene glycol mono-$C_1$–$C_4$-alkyl ethers or di-$C_1$–$C_4$-alkyl ethers, $C_1$–$C_4$-alkyl esters of $C_2$–$C_3$-alkylene glycol mono-$C_1$–$C_4$-alkyl ethers, halobenzenes, $C_1$–$C_4$-alkoxybenzenes, $C_1$–$C_8$-alkyl esters of aromatic carboxylic acids or aromatic nitro compounds.

3. A process as claimed in claim 1, wherein the water-miscible organic liquid of phase (B1) comprises $C_1$–$C_3$-alkanols, acetone or its derivatives, $C_1$–$C_4$-alkanoic acids, which may be substituted by hydroxyl, $C_1$–$C_2$-alkoxy or halogen, aromatic sulfonic acids, aliphatic $C_1$–$C_{12}$-amines and -alcoholamines, $C_2$–$C_4$-alkylene glycols, di-, tri- or tetra-$C_2$–$C_3$-alkylene glycols or $C_2$–$C_3$-alkylene glycol mono-$C_1$–$C_2$-alkyl ethers.

4. A process as claimed in claim 1, wherein the two-phase system used consists essentially of A1) a $C_2$–$C_3$-alkylene glycol mono-$C_3$–$C_6$-alkyl ether or di-$C_1$–$C_4$-alkyl ether and B2) water, hydrochloric acid and/or sulfuric acid.

5. A process as claimed in claim 1, wherein the treatment is carried out in the presence of auxiliaries customary for the further use of the solids.

6. The process of claim 1 wherein said hydrophobic solids are copper phthalocyanines.

7. A process as claimed in claim 1, wherein phase B) is phase B1).

8. A process as claimed in claim 7, wherein phase B1) contains an inorganic acid or an inorganic base.

9. A process claimed in claim 1, wherein phase B) is phase B2).

10. A process as claimed in claim 5, wherein said auxiliaries are resins, plasticizers, laking agents, waxes, nitrocellulose or dustproofing agents.

* * * * *